Feb. 25, 1964     F. E. VERMES     3,122,132
BALL POINT PEN
Filed June 28, 1961
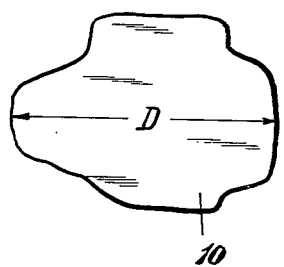
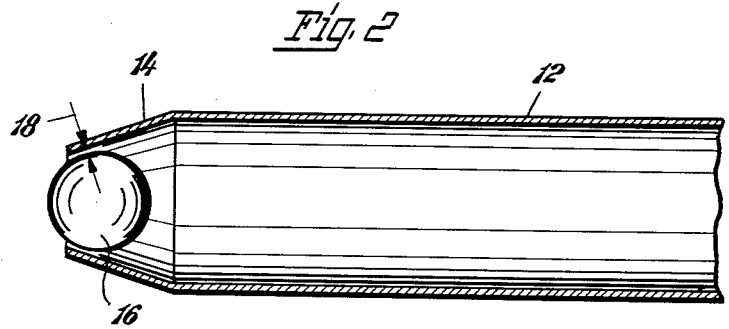

United States Patent Office 3,122,132
Patented Feb. 25, 1964

3,122,132
BALL POINT PEN
Franz Eugen Vermes, Palnkammerstrasse 18,
Otterfing, Upper Bavaria, Germany
Filed June 28, 1961, Ser. No. 126,462
Claims priority, application Germany June 29, 1960
5 Claims. (Cl. 120—42.4)

This invention relates to improvements in ball point pen inks and inserts for dispersing the same, as well as to related methods.

It is one of the primary objects of the invention to provide an improved ink especially adapted for use in ball point pens.

It is another primary object of the invention to provide an improved insert or filler especially adapted for use with ball point pens and with the ink of the invention.

Another primary object of the invention relates to the provision of an improved method for preparing inks especially suitable for ball point pens.

Still another primary object of the invention relates to the provision of an improved method for preparing ball point pen inserts especially suited for employing the ink provided in accordance with the invention.

Known inks for ball point pens are generally not suited for writing on dark surfaces such as the black pages frequently employed in albums. It is a further object of the invention to provide improved inks which may be used for this purpose.

It is known to employ in ball point pen inks soluble colors and pigments for color correction. It has, however, heretofore been impossible to employ a pigment content greater than 5% by weight, since it has been found that larger concentrations of pigments impair the writing properties of the associated ink. This is true even if pigments are employed in finely divided form.

It is an object of the invention to provide an improved ink avoiding the above noted difficulties and adapted for the incorporation of a pigment content in excess of that heretofore employed.

It is also known to provide writing implements known as "liquid pencils" wherein graphite is suspended in a solvent. However, due to the color of the graphite it is not possible to employ such an implement for writing on dark materials since the contrast required for readability is lacking.

The use of metal powders for various purposes is also known but this also fails to solve the problem of providing a ball point pen paste ink which is suitable for writing on dark surfaces.

Specifically, therefore, it is an object of the invention to provide a solution for the problem of providing an ink adapted for writing on dark surfaces.

In achieving the above and other of its objectives, the invention contemplates the provision of an ink which comprises a dispensing agent wherein is incorporated 5 to 90% by weight of a coloring substance constituted by metallic flakes or laminae. These flakes have a preferred size range as will be set forth hereinafter and are incorporated into a ball point pen insert in a preferred manner, as will also be described hereinafter in greater detail. Moreover, the insert may be of preferred construction as will be shown.

Advantageously, and surprisingly, it has been found that the coloring substances employed in accordance with the invention remain dispersed in the associated dispersing agent for prolonged periods of storage and use. This is particularly surprising in that it would be normally supposed that the metallic particles of the invention would quickly precipitate due to high specific gravity. The form of the particle is believed to contribute to the fact that said particles do not precipitate and thus result in a useful, long lasting ink.

The invention will next be described in detail with reference to the accompanying drawing in which:

FIGURE 1 diagrammatically illustrates a flake employed in accordance with the invention; and FIGURE 2 illustrates diagrammatically, and in axial section, a portion of a ball point pen insert provided in accordance with the invention.

As stated above, the invention contemplates the use of a coloring substance dispersed in a dispersing agent. The dispersing agent may, for example, be a polar or non-polar solvent such as indicated below in the specific examples given hereinafter. The coloring substances are finely divided metals or metallic alloys employed in the form of flakes, foils, leaflets or laminae.

Flakes are especially well suited since they, surprisingly, remain in suspension and because they are readily adapted to pass through the gap between the ball of a ball point pen and the surrounding parts of the writing point or tapered tip.

A typical flake, which is shown by way of illustration and not for purposes of limitation, is shown in FIG. 1 in the form of element 10. This element has a diameter across its maximum breadth which preferably lies within the range of 1–20 microns and is even more preferably within the range of 5–15 microns. The flake is relatively flat.

In contrast to the art known heretofore, these flakes may be employed in an amount lying within the range of 5–90% by weight relative to the total weight of the ink. Preferably, an amount within the range of 20–80% of the total weight of the ink is employed.

Part of a ball point pen insert is shown in axial section in FIG. 2 wherein it is seen that the insert comprises a hollow body 12, wherein the ink is adapted to be stored, and a writing point or tapered tip 14 at an extremity of said hollow body. Within the writing point is accommodated in conventional manner a writing or dispersing ball 16 which protrudes from said point and is adapted to distribute the ink upon a writing surface.

According to the invention, the ball and the surrounding flange, as indicated by reference numeral 18, is maintained between about $1\times10^{-4}$ to $2.5\times10^{-3}$ centimeters. Preferably this range is limited to $1\times10^{-3}$ to $2.5\times10^{-3}$ centimeters.

The dispersing agents as noted above are polar and non-polar solvents and are those solvents which are generally used in the ball point pen industry and are commercially available.

In the past, inserts of the type illustrated in FIGURE 2 have been prepared with two general procedures. In accordance with one of these procedures the ink is inserted through the end remote from the writing point and air inclusions are expelled by centrifuging. Alternatively, the ink is inserted from an end on which the writing point is ultimately formed, centrifuging then being effected also for the purpose of expelling air inclusions.

However, according to the invention, the ink is introduced via the end on which the writing point is to be formed and the writing point or tapered tip is formed as the ink is inserted, the writing ball being inserted after the insertion of the ink has been completed. This prevents metal particles from settling due to centrifuging.

Some specific examples of the invention follow next below.

*Example 1*

Added to a mixture of:
    26 parts of sulfonated castor oil (Turkey-red oil)
    16 parts of polyglycol mol. weight 400
    8 parts of glycerin
are:
    50 parts of silver powder, lamelliform (laminiform), average particle size: $5-15\mu$.

*Example 2*

Added (admixed) to a solution of:
    20 parts of chlorinated coumarone resin
in
    25 parts of phthalic acid-di-octyl ester and
    15 parts of castor oil
are:
    30 parts of aluminum powder, lamelliform average particle size: $1-10\mu$.

*Example 3*

Added (admixed) to a solution of:
    14 parts of coumarone resin
in
    32 parts of phthalic acid-di-octyl ester
are:
    6 parts of aluminum powder, lamelliform having an average particle size of $1-10\mu$,
and
    48 parts of bronze powder consisting of an alloy of 92% Cu and 8% Zn having an average particle size of $5-20\mu$.

There will now be obvious to those skilled in the art many modifications and variations of the product, structure and methods set forth above. These modifications and variations will not depart from the scope of the invention as defined by the following claims.

What is claimed is:

1. A writing instrument comprising a hollow body, a supply of paste ink within the hollow, a ball point coupled to the paste ink supply and located in writing position at one end of the hollow body, and a passage between said ball and said one end of said hollow body, said passage having a breadth of about $1\times10^{-4}$ to $2.5\times10^{-3}$ centimeters, said paste ink consisting essentially of a dispersion of a finely divided substance selected from the group consisting of aluminum, silver, copper and alloys and mixtures thereof in a dispersing agent consisting of a solvent which is selected from the group consisting of polar and non-polar solvents, said finely divided substance being in flake-like form of an extent in the range of between about 1 to 20 microns.

2. A writing instrument as defined in claim 1 in which the finely divided substance has an extent in the range of between about 5 to 15 microns.

3. A writing instrument as defined in claim 2, in which said dispersing agent is a mixture of sulfonated castor oil, polyglycol and glycerin.

4. A writing instrument as defined in claim 2, in which said dispersing agent is a solution of chlorinated coumarone resin in phthalic acid-di-octyl ester and castor oil.

5. A writing instrument as defined in claim 2, in which said dispersing agent is a solution of coumarone resin in phthalic acid-di-octyl ester.

References Cited in the file of this patent

UNITED STATES PATENTS

| | | |
|---|---|---|
| 1,489,357 | McElroy | Apr. 8, 1924 |
| 2,225,289 | Wood | Dec. 17, 1940 |
| 2,252,702 | Curado | Aug. 14, 1941 |
| 2,280,135 | Ward | Apr. 21, 1942 |
| 2,408,256 | Florman | Sept. 24, 1946 |
| 2,474,520 | Fleming | June 28, 1949 |
| 2,525,279 | Allen | Oct. 10, 1950 |
| 2,715,388 | Cofield et al. | Aug. 16, 1955 |
| 2,941,894 | McAdow | June 21, 1960 |
| 3,094,103 | Trefzer | June 18, 1963 |

OTHER REFERENCES

Gould et al.: Inks for ball point pens, American Ink Maker, June 1951 ed. (pp. 40–43, 61); July 1951 ed. (pp. 36–40, 67).

Edwards' Aluminum Paint and Powder, 2d ed., published 1936 by Reinhold, New York. (A copy is in the Scientific Library.) Page 21 is referred to.